April 14, 1936.  V. E. MOODY  2,037,198
AUTOMATIC SAFETY BACKSTOP
Filed July 8, 1935  4 Sheets-Sheet 1
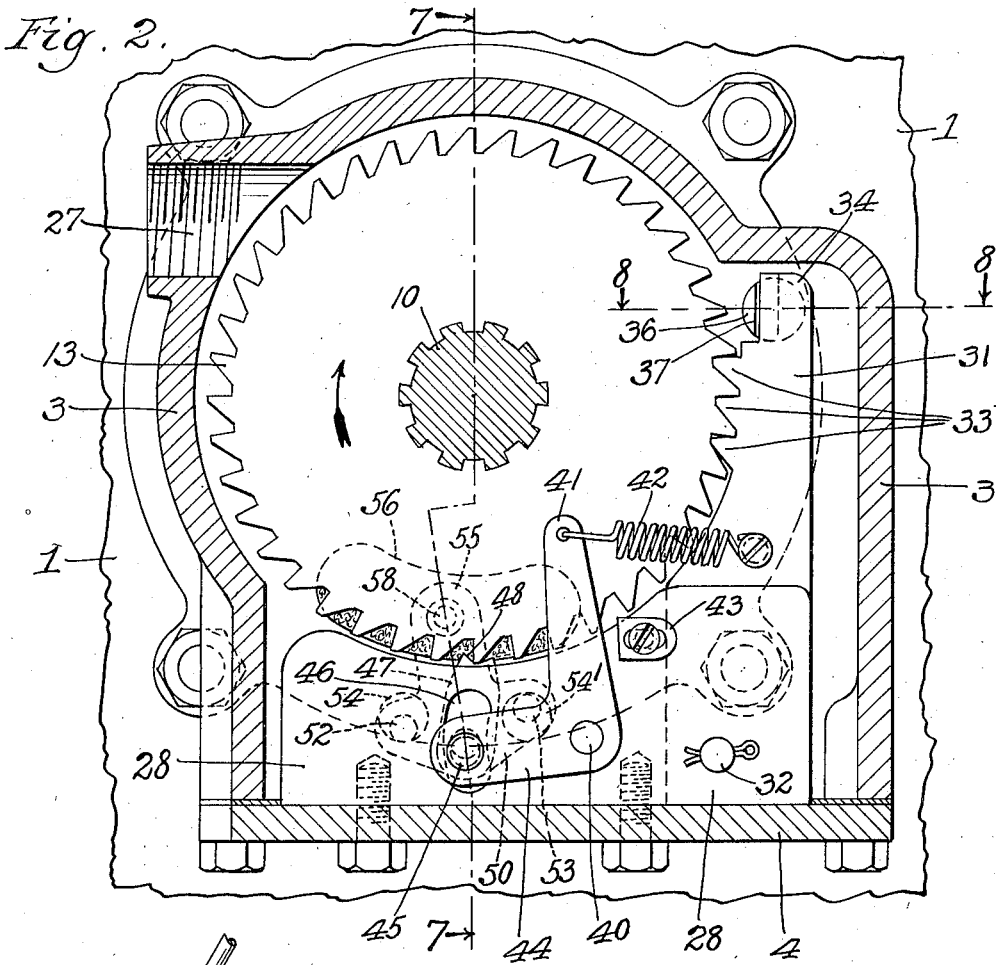
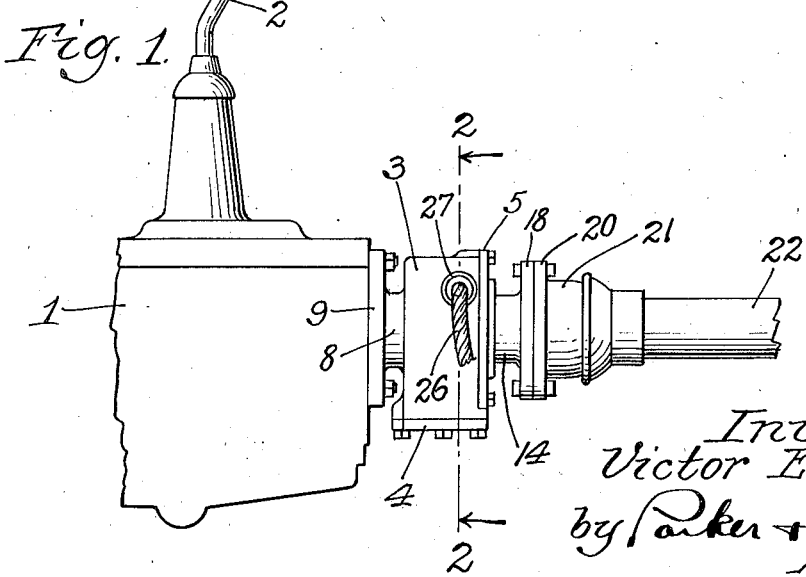
Inventor
Victor E. Moody
by Parker + Carter
Attorneys April 14, 1936.  V. E. MOODY  2,037,198
AUTOMATIC SAFETY BACKSTOP
Filed July 8, 1935  4 Sheets-Sheet 2

Inventor
Victor E. Moody
by Parker + Carter,
Attorneys.

Inventor
Victor E. Moody
by Parker + Carter
Attorneys.

Inventor
Victor E. Moody
by Parker + Carter
attorneys.

Patented Apr. 14, 1936

2,037,198

UNITED STATES PATENT OFFICE 2,037,198

AUTOMATIC SAFETY BACKSTOP

Victor E. Moody, Elgin, Ill., assignor to Desmond V. Moody, Elgin, Ill.

Application July 8, 1935, Serial No. 30,271

21 Claims. (Cl. 192—4)

This invention relates to an automatic roll back check applied to the transmission of power driven vehicles.

It has for one object to provide automatic means for preventing accidental reverse movement of the vehicle. It has for another object to provide an automatic roll back check so arranged that it is effective automatically and without any manipulation of the controls of the vehicle. Another object is to provide an automatic roll back check which is automatically made inoperative when the controls of the vehicle are manipulated positively to cause reverse movement of the vehicle.

Other objects will appear from time to time in the specification and claims.

The invention is illustrated more or less diagrammatically in the accompanying drawings, wherein:—

Figure 1 is a side elevation of a portion of the driving mechanism of an automotive vehicle;

Figure 2 is a transverse generally vertical section taken on an enlarged scale at line 2—2 of Figure 1 and showing the mechanism in locking position;

Like parts are designated by like characters throughout the specification and drawings.

Figure 3:
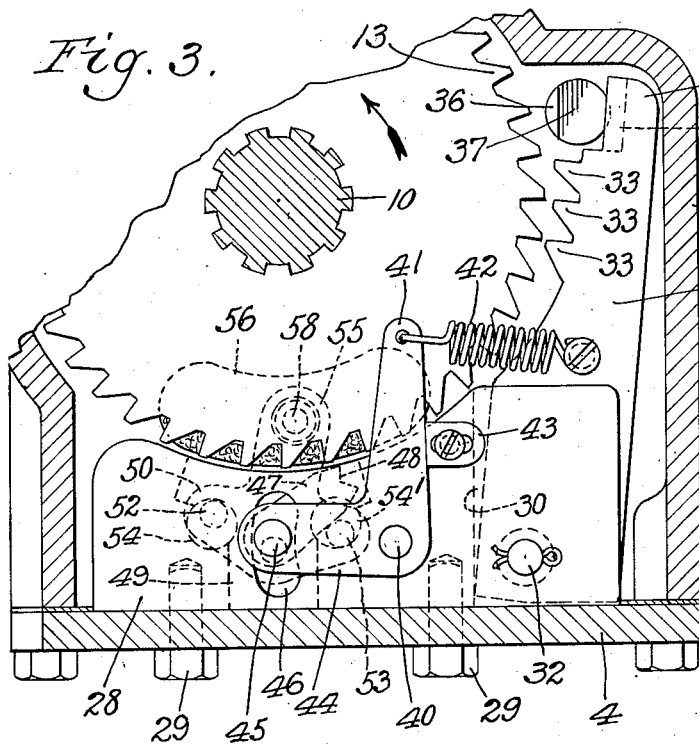
Figure 3 is a view generally similar to Figure 2, with parts omitted and showing the mechanism unlocked.
Figure 4:
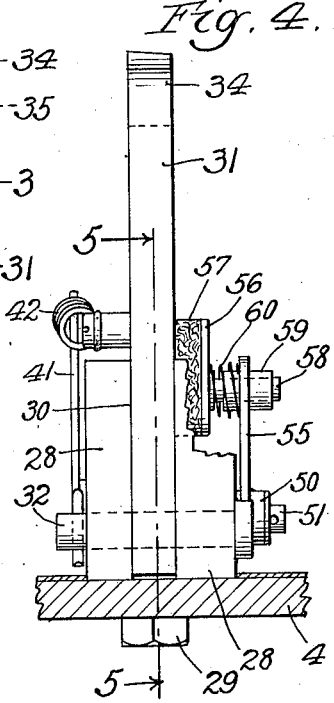
Figure 4 is a fragmentary side elevation showing the locking ratchet and associated mechanism separately.

1 indicates a conventional transmission housing of an automotive vehicle. 2 is the gear shift lever. 3 is the housing for the roll back check of the present invention. The housing may be of any desired form, but as shown it is made generally in one piece and provided with a removable plate 4 by means of which it may be opened and its contents inspected or removed. At its rear the housing 3 carries a plate 5 perforated as at 6 and carrying an oil ring 7. At its forward end the housing may be reduced as at 8 and provided with a flange 9 for attachment to the transmission housing 1. A main shaft 10 passes from the transmission and is supported in a bearing 11 and extends through the housing 3. The shaft is splined as shown. A spacing ring 12 is positioned upon it in rear of the bearing 11 and a ratchet wheel 13 is splined on the shaft 10 and is held against one end of the spacing ring 12 by a member 14 which is also splined on the shaft and is itself locked in position thereon by means of a washer 15 and a nut 16, positioned on the threaded reduced portion 17 of the shaft 10. The member 14 may carry at its outer end a flange 18 perforated as at 19. This flange, in the form shown, is attached to a similar flange 20 which forms a part of a universal joint housing 21. A propeller shaft 22 extends rearwardly from the universal joint. The transmission, the gear shift, the gear shift lever, the universal joints and the propeller shafts may all be conventional and this invention is not limited to nor concerned with any particular type of transmission. Hence these parts are not shown in greater detail and will not be further described.

The member 14 is reduced as at 23 to receive a speedometer gear 24. A speedometer pinion 25 on a shaft 26 meshes with the gear 24. The speedometer parts form no essential part of the present invention, but are shown here merely as indicating their position in a more or less conventional assembly. The housing 3 is provided with an interiorly threaded connection or opening 27 within which a speedometer shaft mounting is positioned and through which the speedometer shaft extends into the housing.

The roll back check mechanism which will now be described includes generally a member driven from said transmission, which may be a rotary member such as the ratchet wheel 13 mounted on the main shaft 10 together with stop or holding means for engaging it to lock it and with operating means for effecting this engagement and for further operating means for preventing it when reverse movement of the vehicle is positively accomplished by moving the gear shift lever into the reverse position.

The locking mechanism is supported in a bearing and positioning block 28 which is secured to the plate 4 by screws 29 or in any other suitable manner. At one side the block 28 is provided with a slot 30 within which the ratchet pawl 31 is pivoted on the member 32. Adjacent its upper end the pawl is provided with one or more locking teeth 33 of such size and shape as to mesh readily with the teeth of the ratchet wheel 13. At its upper end the pawl 31 is reduced as at 34 and provided with an inclined face 35, the inclination being in the forward direction, or toward the transmission housing. Slidably mounted in a suitable bearing within the housing 3 and extending from the transmission and controlled by the gear shift mechanism so as to move backward and forward as the transmission is moved into reverse and out of it, is a reverse rod 36 having an inclined face 37, preferably inclined to the same degree as the inclined face 35 of the ratchet pawl. Within a cavity 38 in the block 28 is a compression spring 39 which bears against the ratchet pawl 31 and tends to hold it in the backward or unlocking position when free to do so.

Pivoted on the bearing block 28 as at 40 is a bell crank, the arm 41 of which engages one end of a spring 42 which at its other end is secured to the pawl 31. The spring thus tends, when free to do so, to rotate the bell crank toward the right as shown for example in Figure 3. An adjustable stop 43, mounted on the block 28, limits the movement of the bell crank under the influence of the spring 42. The other arm 44 of the bell crank carries a pin 45 which extends into an arcuate slot 46 in the block 28. Pivoted on the pin 45 is a dog 47 having a notched free end or face 48. The dog lies within an irregularly shaped cavity 49, formed within the block 28.

Supported upon the block 28 and positioned in the opposite side from the bell crank 41, 44, is a rocker arm 50. It is supported for swinging movement upon a stud 51 which is itself fixed in the block 28. Projecting inwardly from the member 50 are two pins 52, and 53, which lie, respectively, within rounded portions 54, 54' of the cavity 49. Extending upwardly from the plate 50 is a lever arm 55 from which a friction plate 56 is supported. This fraction plate carries braking or friction material 57 which is in contact with the side of the ratchet wheel. The plate 56 is carried by a stud 58 which has bearing in a member 59, carried by the arm 55. A spring 60 presses the plate, preferably lightly, against the side of the ratchet.

It will be realized that whereas I have herewith shown and described a practical operative device, nevertheless many changes might be made in the size, shape, number and disposition of parts without departing from the spirit of the invention and I wish, therefore, that my showing be taken as in a sense diagrammatic.

The use and operation of my invention are as follows:

When the vehicle is being driven forward the main shaft rotates in the direction of the arrow in Figure 3. When in that position the spring 39 holds the ratchet pawl as shown in Figure 3 and out of engagement with the ratchet.

If the vehicle accidentally begins to roll backward at a time when the transmission is not in reverse, so that the wheels rotate backward, the main shaft will be driven backward and the ratchet will rotate in the reverse direction, that is in the direction of the arrow of Figure 2. When that occurs the frictional engagement of the friction plate with the ratchet wheel will move the friction plate to the left as shown in Figure 2, from the position shown in Figure 3. As this occurs the pin 53 moves the dog 47 into the path of the ratchet teeth. The dog engages these teeth and is rotated by them, its lower or pivoted end being forced downwardly. This depresses the arm 44 of the bell crank and moves the arm 41 to the left from the position shown in Figure 3 to that shown in Figure 2. This movement is transmitted through the spring 42 to the pawl 31. The spring 39 is compressed and the pawl is moved to the left until the teeth 33 of the ratchet pawl engage the teeth of the rachet wheel and lock the ratchet wheel, the main shaft and the running gear against further movement in the reverse direction.

Should forward movement of the vehicle commence, the dog, which is still in contact with a tooth of the ratchet wheel, will be moved now to the right from the position shown in Figure 2 to that shown in Figure 3. When pressure is removed from the dog the bell crank is restored to its original position by the contraction of the spring 42 and the spring 39 is then free to move the ratchet pawl out of engagement with the teeth of the ratchet wheel. The shape of the teeth of the pawl and the wheel is such that this reverse or unlocking movement is accomplished with a minimum of frictional resistance. From the foregoing it is apparent that the bell crank 41—44, spring 42, pin 45 and dog 47 comprise a pawl or latch operating assembly, which is actuated or rendered inoperative as a whole in response to movement of the frictional element 57 due to its engagement with the ratchet wheel 13.

Since the ratchet is positioned in the line of power transmission in rear of the transmission housing, the mechanism will operate as described, whenever the gear shift is in first, second or third speeds or in neutral. It is only when the gear shift has been moved positively to the reverse position that the mechanism will not operate to lock and to prevent accidental roll back. At that time, of course, rearward movement is desired.

Figure 5:
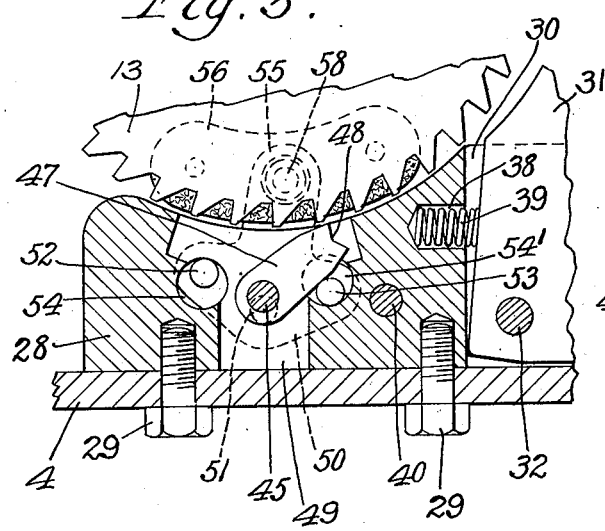
Figure 5 is a sectional detail taken at line 5—5 of Figure 4.
Figure 6:
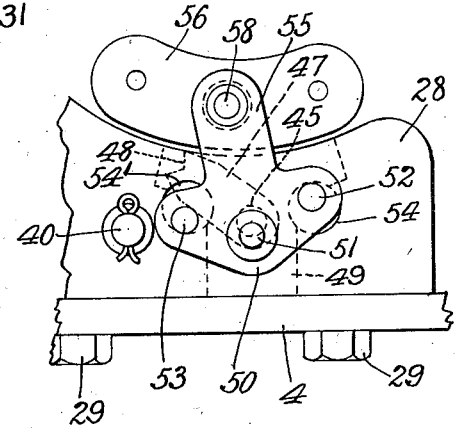
Figure 6 is a side elevation of the brake shoe and rocker arm to which it is attached, showing separately from the side opposite that of Figure 5.
Figure 7:
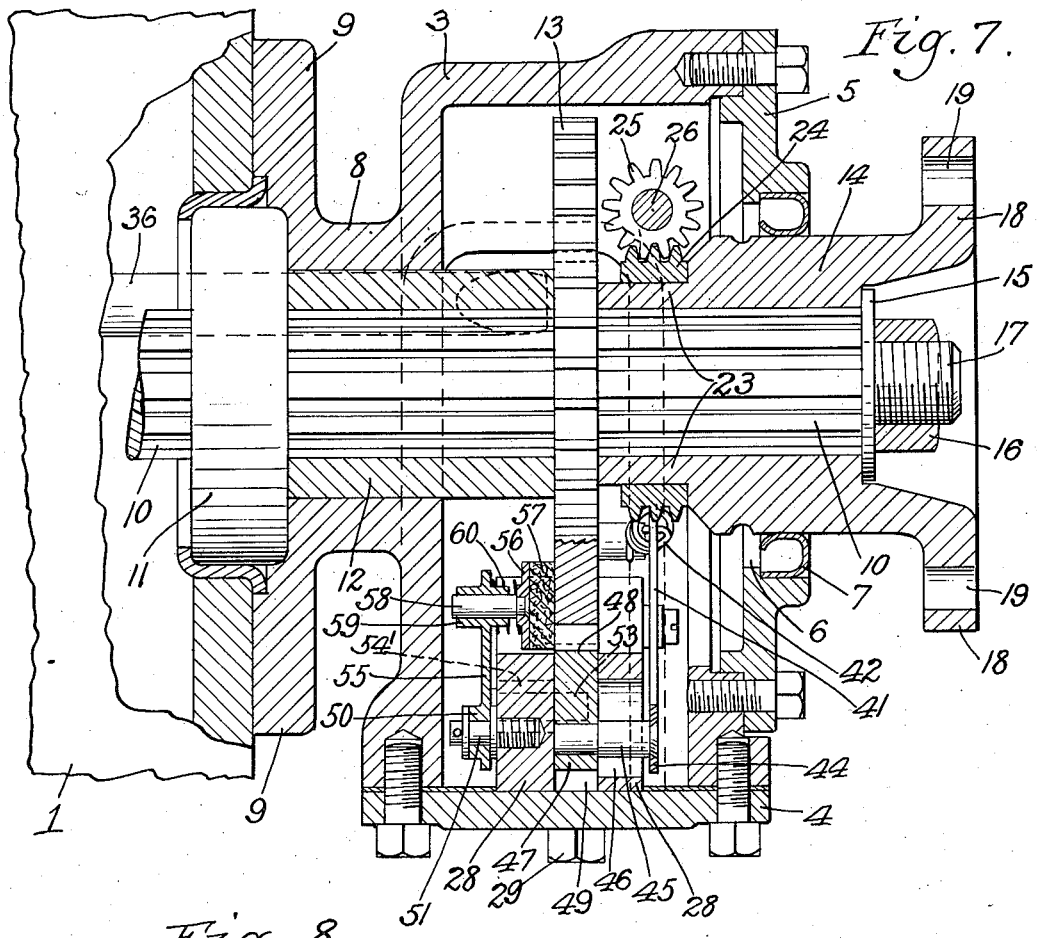
Figure 7 is a transverse generally vertical view taken at line 7—7 of Figure 2.
Figure 8:
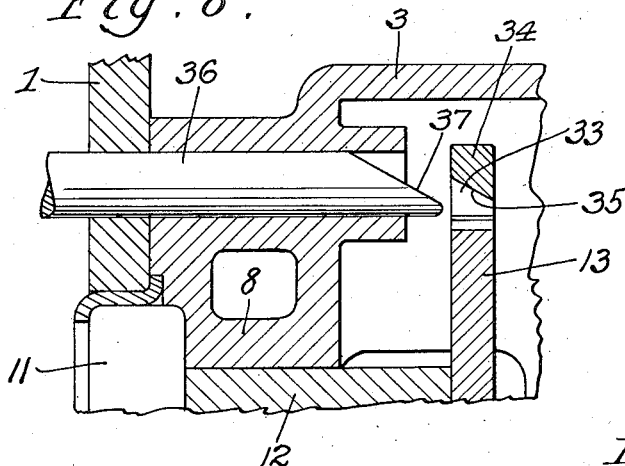
Figure 8 is a generally horizontal and longitudinal sectional detail, taken at line 8—8 of Figure 2 showing the reversing rod in its association with the locking ratchet.

The reverse rod 36 is so associated with the gear shift mechanism that when the lever is moved to shift the mechanism into reverse position the rod 36 is moved backwardly from the position shown in Figure 8 until its inclined face 37 contacts the inclined face 35 of the upper end 34 of the ratchet pawl 31. It thus furnishes, when in this position, a positive stop and prevents any movement of the ratchet pawl toward the ratchet wheel and so positively prevents any locking effect. With the ratchet pawl thus positively locked out of engagement and held against movement, when the vehicle moves to the rear, the main shaft rotates in the direction of the arrow of Figure 2. During the first stages of this movement the parts operate in part as above described. The friction plate moves from the position of Figure 3 to that of Figure 2. The friction plate lever rotates and the pins 52 and 53 are carried with it from the position shown in Figures 3 and 5 to that shown in Figure 2. It will be noticed that in Figure 2, which is the locking position, the bell crank lever 41, 44 has not moved its full limit because the pin 45 has not reached the bottom of the arcuate slot 46 in the block 28. When positive reverse is taking place after the bell crank has moved to the position shown in Figure 2, since no locking is taking place the reverse movement of the ratchet wheel continues and the dog 47 is moved further to the left, thus further depressing the arm 44 of the bell crank and further expanding the spring 42. This movement continues until the dog has been swung far enough to the left from the position shown in Figure 2 to move out of the path of the teeth of the ratchet wheel to the position shown in Figure 9, where it remains until further forward movement of the vehicle occurs. When the parts have reached the position shown in Figure 9 they will remain in that position even though the gear shift is shifted forward. For example, after the car has been stopped and then driven positively in reverse with the gear shift in reverse position, the controlling parts are carried over to the position of Figure 9 by the engagement of the friction plate 56 with the ratchet wheel 13. Since the member 36 locks the ratchet 31 against engagement with the ratchet wheel 13 no locking contact of the teeth 33 of the ratchet 31 with the teeth of the ratchet wheel 13 can occur. If now the gear shift be moved to neutral the car may roll back without any locking effect occurring because the friction plate is already in the extreme position, having moved by its contact with ratchet wheel 13. This is advantageous because frequently after the car has been driven backward and when the gear shift is about to be or has been shifted for forward movement, it may be desirable to allow the car to roll back slightly. This is frequently true in driving and also important when cars are pushed about the garage. When the car is being driven and if the gear shift has been moved to the forward position but until the clutch is operated to permit the usual forward driving, the parts remain in the position shown in Figure 9 and so permit the car to roll backward. At such times it is obviously under the control of the operator associated with the backward rolling, which can be checked instantaneously by letting the clutch in, causing the engine to move the shaft 10 and ratchet wheel 13, or to drive the car ever so slightly forward. Instantaneously upon the occurrence of any forward driving of the vehicle, or movement of the ratchet wheel 13 in the forward direction, the friction plate 16 is moved with the ratchet wheel to the position of Figures 3 and 5 and the parts are again in position automatically locking to check accidental movement of the car. It is to be remembered that when the dog 47 moves from the position of Figure 3, for example, to that of Figure 9, it is dropped to its extreme lower position, this being permitted by the action of the spring 42 upon the bell crank 41, 44 which spring expands as shown in particular in Figure 2, when the dog is forced downwardly.

The operation just described indicates that the mechanism of the present invention comprises in effect a "nullifying device" for the whole checking mechanism, that is to say when the car has once been driven positively in reverse, the checking mechanism moves to a "nullifying position" and it will remain in that position irrespective of further adjustment or moving of the gear shift mechanism until positive forward movement occurs of the car. This is of importance in many cases and particularly where the car is to be pushed about a garage without a driver in the seat. In that case the gear shift is moved to reverse, the car is pushed very slightly to the rear, the gear shift is then moved to neutral position and the car may therefore be manipulated about by pushing and pulling and the checking mechanism remains in the nullified position.

Figure 9:
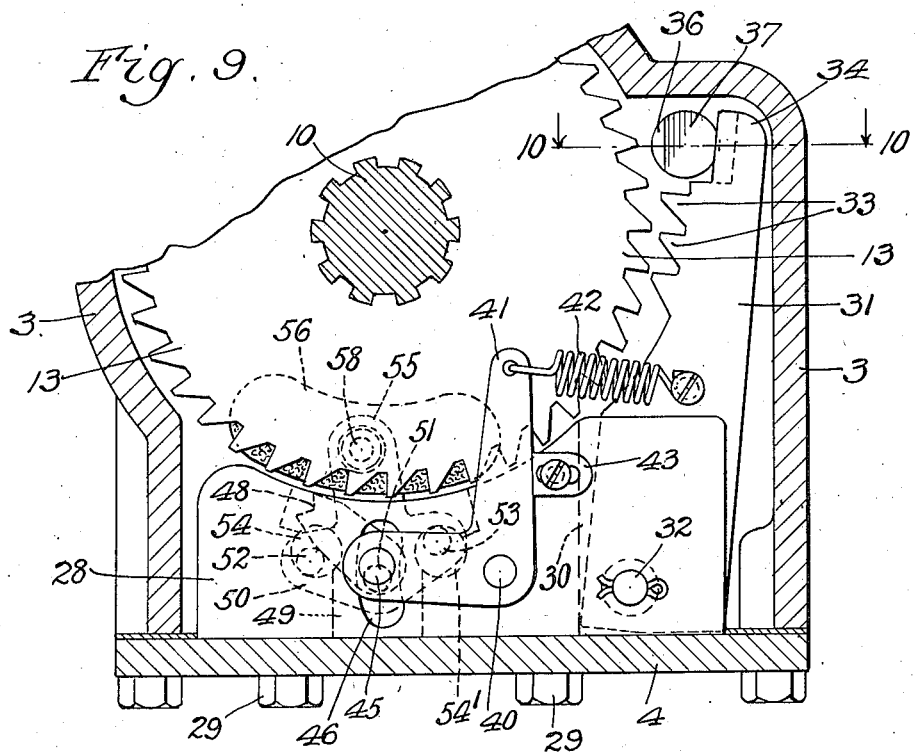
Figure 9 is a view generally similar to Figures 2 and 3, showing the parts in the position which they occupy when in reverse gear and after rearward movement of the vehicle has taken place.
Figure 10:
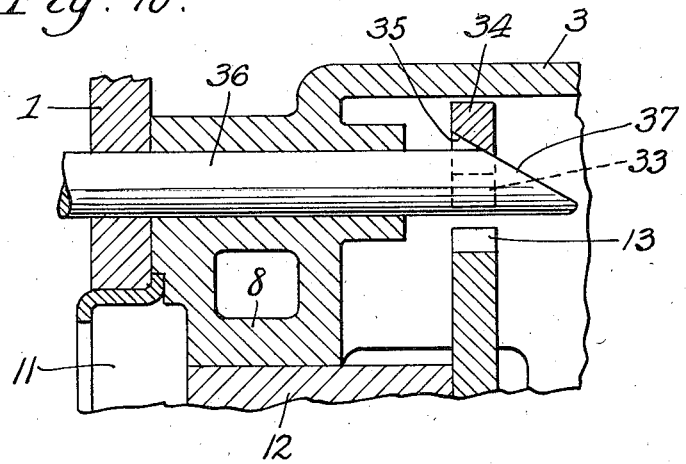
Figure 10 is a sectional detail generally similar to Figure 8 showing the parts in the position which they occupy when in reverse gear.

When positive forward movement of the vehicle occurs the friction plate 56 is carried to the right from the position shown in Figure 9 and the action is the same as that described in moving the locking position of Figure 2. It differs only in that the dog 47 has a further reverse movement to, in moving from Figure 9 to Figures 2 or 3, make before it is returned to the original or unlocked position of Figure 3.

I claim:

1. In combination in a back stop for an automotive vehicle having a transmission, a reverse gear and a drive shaft, a back stop assembly comprising a member driven from said transmission, and a stop adapted to engage said member to hold the same against undesired rearward movement, and means for controlling the movement of said stop, said means comprising a part in engagement with said member, a linkage between said part and said stop, means operative upon said stop when free to do so to hold the same out of operative engagement with the member, said part effective upon undesired reverse movement of said member to move said stop into stopping engagement with said member, and means associated with the transmission to lock said stop against engagement with said member when the transmission is operated for desired rearward movement, said stop operating mechanism, once the vehicle has been given the desired rearward movement, remaining inoperative until positive forward movement of the member has occurred.

2. In combination in a back stop for an automotive vehicle having a transmission, a reverse gear and a drive shaft, a back stop assembly comprising a rotary part driven from said transmission, and a stop adapted to engage said rotary part to hold the same against undesired rearward movement, and means for controlling the movement of said stop, said means comprising a member in engagement with said rotary part, a linkage betwen said member and said stop, means operative upon said stop when free to do so to hold the same out of operative engagement with the rotary part, said member effective upon undesired reverse movement of said ratchet to move said stop into stopping engagement with said rotary part, and means associated with the transmission to lock said stop against engagement with said rotary part when the transmission is operated for desired rearward movement, said stop operating mechanism, once the vehicle has been given the desired rearward movement, remaining inoperative until positive forward movement of the rotary part has occurred.

3. In combination in a back stop for an automotive vehicle having a transmission, a reverse gear and a drive shaft, a back stop assembly comprising a member driven from said transmission, and a holding member adapted to engage said member to hold the same against undesired rearward movement, and means for controlling the movement of said holding member, said means comprising a frictional part in engagement with said member, a linkage between said frictional part and said holding member, means operative upon said holding member when free to do so to hold the same out of operative engagement with the member, said frictional part effective upon undesired reverse movement of said member to move said holding member into holding engagement with said member, and means associated with the transmission to lock said holding member against engagement with said member when the transmission is operated for desired rearward movement, said holding member operating mechanism, once the vehicle has been given the desired rearward movement, remaining inoperative until positive forward movement of the member has occurred.

4. In combination in a back stop for an automotive vehicle having a transmission, a reverse gear and a drive shaft, a back stop assembly comprising a rotary member driven from said transmission, and a stop adapted to engage said rotary member to hold the same against undesired rearward movement, and means for controlling the movement of said stop, said means comprising a frictional part in engagement with said rotary member, a linkage between said frictional part and said stop, means operative upon said stop when free to do so to hold the same out of operative engagement with the rotary member, said frictional part effective upon undesired reverse movement, of said rotary member to move said stop into holding engagement with said rotary member, and means associated with the transmission to lock said stop against engagement with said ratchet member when the transmission is operated for desired rearward movement, said stop operating mechanisms, once the vehicle has been given the desired rearward movement, remaining inoperative until positive forward movement of the member has occurred.

5. In combination in a back stop for an automotive vehicle having a transmission, a reverse gear and a drive shaft, a back stop assembly comprising a member driven from said transmission, and a stop adapted to engage said member to hold the same against undesired rearward movement, and means for controlling the movement of said stop, said means comprising a frictional part in engagement with said member, a linkage between said frictional part and said stop, spring means operative upon said stop when free to do so to hold the same out of operative engagement with the member, said frictional part effective upon undesired reverse movement of said member to move said stop into holding engagement with said member, and means associated with the transmssion to lock said stop against engagement with said member when the transmission is operated for desired rearward movement, said stop operating mechanism, once the vehicle has been given the desired rearward movement, remaining inoperative until positive forward movement of the member has occurred.

6. In combination in a roll back check, a driven shaft, a transmission having selective forward and reverse gears and means for preventing undesired rearward movement of the vehicle comprising a ratchet wheel driven by said shaft, a locking ratchet latch therefor, yielding means for normally holding said latch out of engagement with the ratchet wheel, positive means for holding the latch out of engagement with the ratchet wheel, said positive means being operated by the reverse mechanism to hold the latch inactive when the transmission is in reverse, a friction member engaging said ratchet wheel, linkage between it and the latch adapted upon desired reverse movement of the ratchet wheel to pull the latch into engagement with the ratchet wheel, said linkage upon rearward movement of the ratchet wheel at a time when said wheel is not latched against rearward movement moving to an inactive position from which it is returned to an active position only upon positive forward movement of the ratchet wheel.

7. In combination in a roll back check, a driven shaft, a transmission having selective forward and reverse gears and means for preventing undesired rearward movement of the vehicle comprising a ratchet wheel driven by said shaft, a locking ratchet latch therefor, means for normally holding said latch out of engagement with the ratchet wheel, positive means for holding the latch out of engagement with the ratchet wheel, said positive means being operated by the reverse mechanism to hold the latch inactive when the transmission is in reverse, a friction member engaging said ratchet wheel, linkage between it and the latch adapted upon undesired reverse movement of the ratchet wheel to pull the latch into engagement with the ratchet wheel, said linkage upon rearward movement of the ratchet wheel at a time when said wheel is not latched against rearward movement moving to an inactive position from which it is returned to an active position only upon positive forward movement of the ratchet wheel.

8. In combination in a roll back check, a driven shaft, a transmission having selective forward and reverse gears and means for preventing undesired rearward movement of the vehicle comprising a ratchet wheel driven by said shaft, a locking ratchet latch therefor, yielding means for normally holding said latch out of engagement with the ratchet wheel, positive means for holding the latch out of engagement with the ratchet wheel, said positive means being operated by the reverse mechanism to hold the latch inactive when the transmission is in reverse, a member engaging said ratchet wheel, linkage between it and the latch adapted upon undesired reverse movement of the ratchet wheel to pull the latch into engagement with the ratchet wheel, said linkage upon rearward movement of the ratchet wheel at a time when said wheel is not latched against rearward movement moving to an inactive position from which it is returned to an active position only upon positive forward movement of the vehicle.

9. In a combination in a roll back check, a driven shaft, a transmission having selective forward and reverse gears and means for preventing undesired rearward movement of the vehicle comprising a ratchet wheel driven by said shaft, a locking ratchet latch therefor, means for normally holding said latch out of engagement with the ratchet wheel, positive means for holding the latch out of engagement with the ratchet wheel, said positive means being operated by the reverse mechanism to hold the latch inactive when the transmission is in reverse, a member engaging said ratchet wheel, linkage between it and the latch adapted upon undesired reverse movement of the ratchet wheel to pull the latch into engagement with the ratchet wheel, said linkage upon rearward movement of the ratchet wheel at a time when said wheel is not latched against rearward movement moving to an inactive position from which it is returned to an active position only upon positive forward movement of the vehicle.

10. In combination in a roll back check, a driven shaft, a transmission having selective forward and reverse gears and means for preventing undesired rearward movement of the vehicle comprising a ratchet wheel driven by said shaft, a locking ratchet latch therefor, yielding means for normally holding said latch out of engagement with the ratchet wheel, positive means for holding the latch out of engagement with the ratchet wheel, said positive means being operated by the reverse mechanism to hold the latch inactive when the transmission is in reverse, a friction member engaging said ratchet wheel, linkage between it and the latch adapted upon undesired reverse movement of the ratchet wheel to pull the latch into engagement with the ratchet wheel, said linkage upon rearward movement of the ratchet wheel at a time when said wheel is not latched against rearward movement mov- 11. In combination in a roll back check, a driven shaft, a transmission having selective forward and reverse gears and means for preventing undesired rearward movement of the vehicle comprising a ratchet wheel driven by said shaft, a locking ratchet latch therefor, means for normally holding said latch out of engagement with the ratchet wheel, positive means for holding the latch out of engagement with the ratchet wheel, said positive means being operated by the reverse mechanism to hold the latch inactive when the transmission is in reverse, a friction member engaging said ratchet wheel, linkage between it and the latch adapted upon undesired reverse movement of the ratchet wheel to pull the latch into engagement with the ratchet wheel, said linkage upon rearward movement of the ratchet wheel at a time when said wheel is not latched against rearward movement moving to an inactive position and adapted to remain in said inactive position irrespective of subsequent adjustment of the gear shift mechanism.

12. In combination in a roll back check, a driven shaft, a transmission having selective forward and reverse gears and means for preventing undesired rearward movement of the vehicle comprising a ratchet wheel driven by said shaft, a locking ratchet latch therefor, yielding means for normally holding said latch out of engagement with the ratchet wheel, positive means for holding the latch out of engagement with the ratchet wheel, said positive means being operated by the reverse mechanism to hold the latch inactive when the transmission is in reverse, a member engaging said ratchet wheel, linkage between it and the latch adapted upon undesired reverse movement of the ratchet wheel to pull the latch into engagement with the ratchet wheel, said linkage upon rearward movement of the ratchet wheel at a time when said wheel is not latched against rearward movement moving to an inactive position, and adapted to remain in said inactive position irrespective of subsequent adjustment of the gear shift mechanism.

13. In combination in a roll back check, a driven shaft, a transmission having selective forward and reverse gears and means for preventing undesired rearward movement of the vehicle comprising a ratchet wheel driven by said shaft, a locking ratchet latch therefor, means for normally holding said latch out of engagement with the ratchet wheel, positive means for holding the latch out of engagement with the ratchet wheel, said positive means being operated by the reverse mechanism to hold the latch inactive when the transmission is in reverse, a member engaging said ratchet wheel, linkage between it and the latch adapted upon undesired reverse movement of the ratchet wheel to pull the latch into engagement with the ratchet wheel, said linkage upon rearward movement of the ratchet wheel at a time when said wheel is not latched against rearward movement moving to an inactive position, and adapted to remain in said inactive position irrespective of subsequent adjustment of the gear shift mechanism.

14. In combination in a roll back check for automotive vehicles, a driven shaft, a ratchet wheel on said shaft, a latch member movably positioned adjacent said wheel and means for moving the latch to engage the wheel upon undesired rearward movement of the vehicle, said means comprising a latch operating assembly movably positioned adjacent the wheel, a frictional element for operating said assembly, said frictional element engaging the wheel and adapted upon movement of the wheel in either direction to move with the wheel throughout a limited distance and to actuate the said operating assembly, and adapted upon reverse movement of the wheel at a time when said wheel is not latched against rearward movement to move the said assembly into an inoperative position and to return it to an operative position only upon forward movement of the wheel.

15. In combination in a roll back check for automotive vehicles, a driven shaft, a ratchet wheel on said shaft, a latch member movably positioned adjacent said wheel, means for holding the latch inoperative to permit desired rearward movement of the vehicle and means for moving the latch to engage the wheel upon undesired rearward movement of the vehicle, said means comprising a latch operating assembly movably positioned adjacent the wheel, an element for operating said assembly, said element engaging the wheel and adapted upon movement of the wheel in either direction to move with the wheel throughout a limited distance and to actuate the said operating assembly, and adapted upon desired reverse movement of the wheel, when said means for holding the latch inoperative is in use, to move the said assembly into an inoperative position and to return it to an operative position only upon forward movement of the wheel.

16. In combination in a roll back check for automotive vehicles, a driven shaft, a ratchet wheel on said shaft, a latch member movably positioned adjacent said wheel, means for holding the latch inoperative to permit desired rearward movement of the vehicle, and means for moving the latch to engage the wheel upon undesired rearward movement of the vehicle, said means comprising a latch operating assembly movably positioned adjacent the wheel, a frictional element for operating said assembly, said frictional element engaging the wheel and adapted upon movement of the wheel in either direction to move with the wheel throughout a limited distance, and adapted upon desired reverse movement of the wheel, when said means for holding the latch inoperative is in use, to move the said assembly into an inoperative position and to return it to an operative position only upon forward movement of the wheel.

17. In combination in a roll back check for automotive vehicles, a driven shaft, a ratchet wheel on said shaft, a latch member movably positioned adjacent said wheel, means for holding the latch inoperative to permit desired rearward movement of the vehicle, and means for moving the latch to engage the wheel upon undesired rearward movement of the vehicle, said means comprising a latch operating assembly movably positioned adjacent the wheel, an element for operating said assembly, said element engaging the wheel and adapted upon movement of the wheel in either direction to move with the wheel throughout a limited distance, and adapted upon desired reverse movement of the wheel, when said means for holding the latch inoperative is in use, to move the said assembly into an inoperative position and to return it to an operative position only upon forward movement of the wheel.

18. In combination in a roll back check for automotive vehicles, a driven shaft, a ratchet wheel on said shaft, a latch member movably positioned adjacent said wheel, means for holding the latch inoperative to permit desired rearward movement of the vehicle, and means for moving the latch to engage the wheel upon undesired rearward movement of the vehicle, said means comprising a latch operating assembly movably positioned adjacent the wheel, an element for operating said assembly, said element engaging the wheel and adapted upon movement of the wheel in either direction to move with the wheel throughout a limited distance, and adapted upon desired reverse movement of the wheel, when said means for holding the latch inoperative is in use, to move the latch operating assembly into an inoperative position and to return it to an operative position only upon forward movement of the wheel, subsequent to movement of the gear shift from reverse drive position.

19. In combination, a roll back check for an automotive vehicle having a driven shaft and a transmission, and selective forward and reverse drives and means for locking said shaft against undesired rearward movement, comprising a wheel driven by said shaft, a latch positioned to engage said wheel, compressible means to hold the latch out of engagement with the wheel, positive means operated in connection with the reverse gear to lock the latch out of engagement with the wheel, and a friction member engaging the wheel, linkage between it and the latch comprising, a pair of stops on said member, a bell crank, a dog pivoted on said bell crank and a flexible connection between said bell crank and said latch, the frictional member effective through a stop, upon undesired reverse movement of the wheel, when the said latch is not locked out of engagement with the wheel, to move the dog into the path of the wheel, the dog effective to move the bell crank and through the flexible member to move the latch into engagement with the wheel when the latch is free for movement.

20. In combination, a roll back check for an automotive vehicle having a driven shaft and a transmission, and selective forward and reverse drives and means for locking said shaft against undesired rearward movement, comprising a wheel driven by said shaft, a wheel engaging member positioned to engage said wheel and hold it against backward rotation, compressible means to hold the wheel engaging member out of engagement with the wheel, positive means operated in connection with the reverse gear to lock the wheel engaging member out of engagement with the wheel, and a friction member engaging the wheel, linkage between it and the wheel engaging member, comprising a pair of stops on said member, a bell crank, a dog pivoted on said bell crank and a connection between said bell crank and said wheel engaging member, the frictional member effective through a stop, upon undesired reverse movement of the wheel, to move the dog into engagement with said wheel, the dog effective to move the bell crank and through the connection member to move the wheel engaging member into holding engagement with the wheel when the wheel engaging member is free for movement.

21. In combination, a roll back check for an automotive vehicle having a driven shaft and a transmission, and selective forward and reverse drives and means for locking said shaft against undesired rearward movement, comprising a wheel driven by said shaft, a pivoted wheel engaging member positioned to engage said wheel and hold it against backward rotation, compressible means to hold the wheel engaging member out of engagement with the wheel, positive means operated in connection with the reverse gear to lock the wheel engaging member out of engagement with the wheel, and a friction member engaging the wheel, linkage between it and the wheel engaging member comprising a pair of stops on said member, a bell crank, a dog pivoted on said bell crank and a flexible connection between said bell crank and said wheel engaging member, the frictional member effective through a stop, upon undesired reverse movement of the wheel, when the said wheel engaging member is not locked out of engagement with the wheel, to move the dog into engagement with the wheel, the dog effective to move the bell crank and through the flexible connection member to move the wheel engaging member into holding engagement with the wheel when the wheel engaging member is free for movement.

VICTOR E. MOODY.